Aug. 14, 1956
F. PERLIN
2,758,505
STEREOSCOPIC VIEWER
Filed Feb. 17, 1953
2 Sheets-Sheet 2
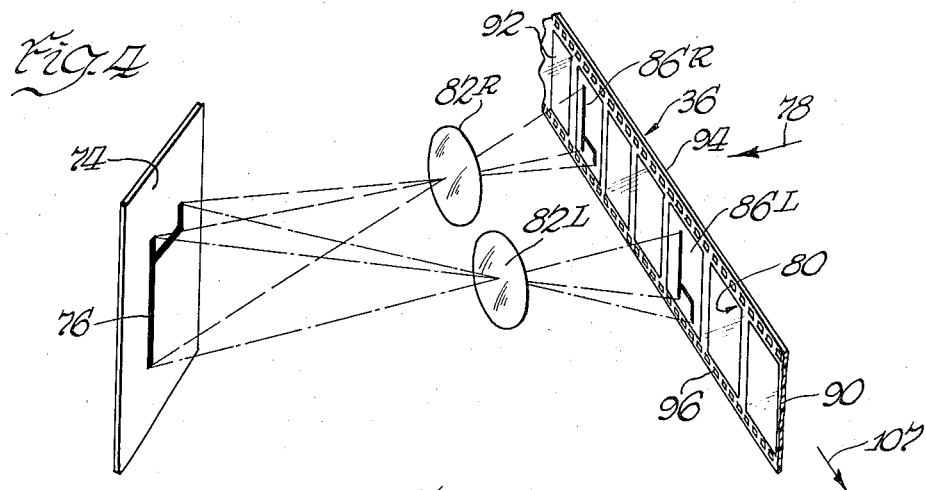
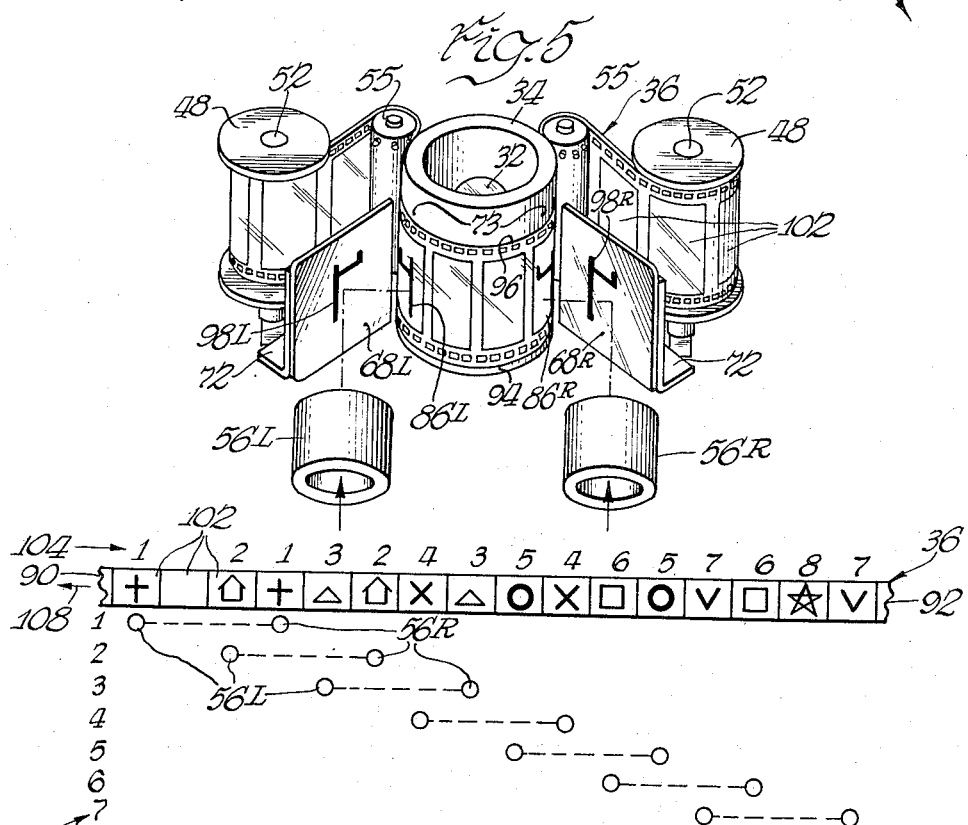
Inventor
Fred Perlin
by Fidler Crowe + Beardsley
Attys.

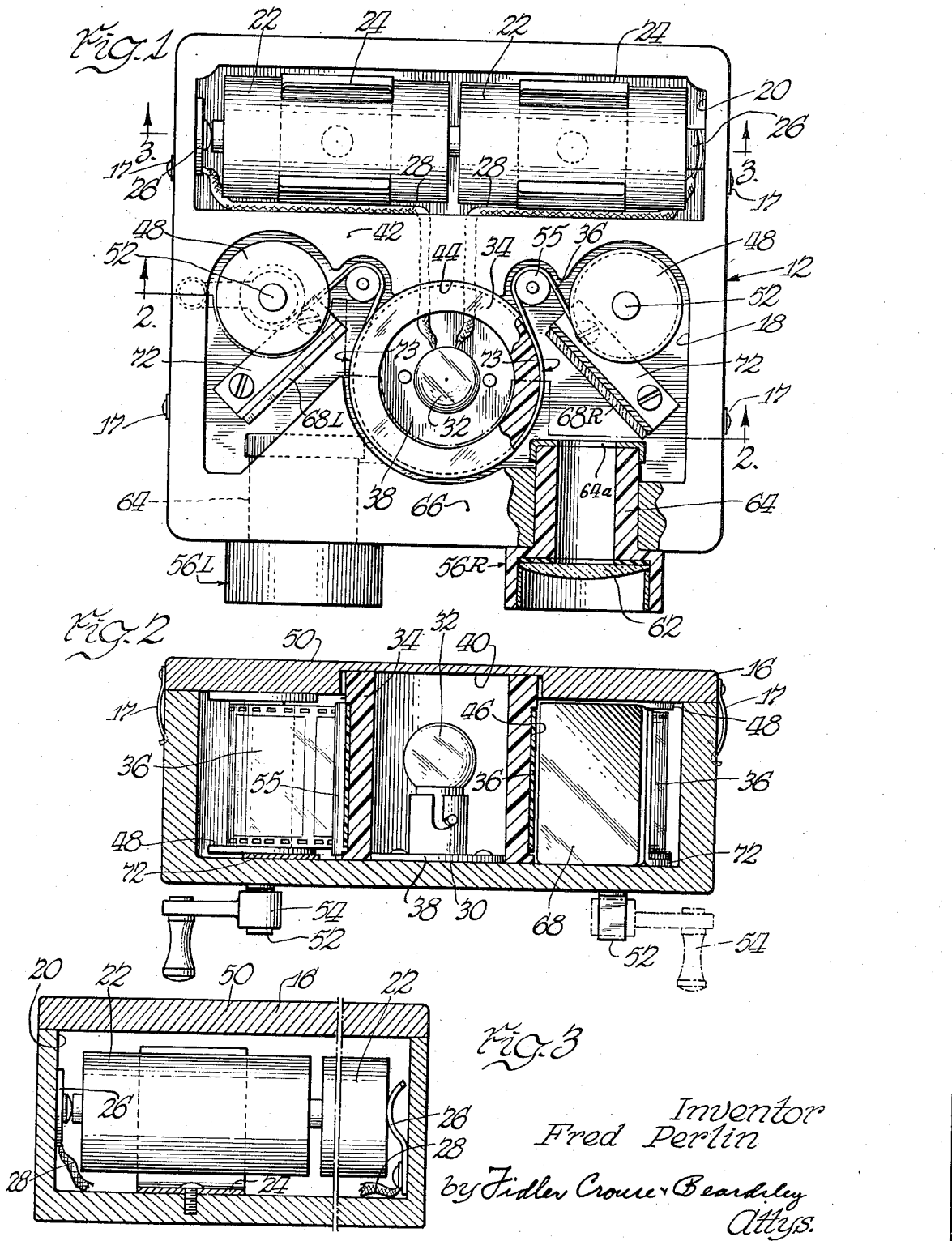

United States Patent Office 2,758,505
Patented Aug. 14, 1956

2,758,505

STEREOSCOPIC VIEWER

Fred Perlin, Edgerton, Wis., assignor to The Parker Pen Company, Janesville, Wis., a corporation of Wisconsin Application February 17, 1953, Serial No. 337,268

2 Claims. (Cl. 88—31)

The present invention relates to stereoscopic viewers and has to do more particularly with a novel viewer adapted to be used with strip transparencies. A strip transparency as the term is used herein is a strip containing a series of pairs of spaced, complementary transparencies resulting from the successive exposure of paired frames on a photographic film in a twin lens stereoscopic camera and subsequent processing of the film in strip form to produce a series of paired complementary images.

Stereoscopic viewers as heretofore constructed have usually employed a simple optical system consisting of two converging lenses spaced at an appropriate distance for viewing directly a pair of complementary (i. e., right and left) spaced transparencies. The images produced on the film strip in common types of stereoscopic cameras are reversed and inverted relatively to the object. Consequently, in order to view these images properly they must be again reversed and again inverted. In prior viewers this can only be done by severing the paired images and remounting them in properly spaced relation.

An object of the present invention is to provide a viewer for transparencies in strip form wherein the strip, in the form in which it has been processed, and without separation of the individual transparencies or frames, may be viewed to produce the desired stereoscopic effect.

More specifically, an object is to provide a viewer of the foregoing character having provision for insertion of strip transparencies therein in inverted position and including a mirror arrangement for reversing the images, whereby the images are presented to the eye oriented according to the object photographed.

Another object is to provide a viewer of the foregoing character which is relatively simple and inexpensive.

Still another object is to provide a stereoscopic viewer capable of holding a relatively large number of image frames in strip form and wherein by relatively simple manipulation the several pairs of complementary frames may be rapidly brought successively into view.

A further object is to provide a viewer adapted for use with stereoscopic transparencies in strip form, wherein a strip of transparencies may be inserted in and removed from the viewer while on a spool, thereby facilitating handling and storage of the strips.

Other objects and advantages of the invention will appear from the following detail description, taken in conjunction with the accompanying drawings, in which—

Figure 1 is a plan view of a viewer constructed in accordance with the present invention, with the cover omitted and showing a portion broken away and one of the lenses and mount therefor in longitudinal sectional view;

Fig. 2 is a sectional view taken on line 2—2 of Fig. 1;

Fig. 3 is a sectional view taken on line 3—3 of Fig. 1;

Fig. 4 is a diagrammatic view illustrating the manner in which the images are inverted and reversed in the operation of exposing the film;

Fig. 5 is a diagrammatic view showing certain of the elements of the viewer and illustrating the manner in which the images on the transparency are presented for viewing; and Fig. 6 is a diagram indicating the successive relative positions of the lenses of the viewer relatively to the strip transparency in viewing the successive pairs of transparencies or frames.

The viewer shown in Figs. 1, 2 and 3 is arranged for supporting the strip transparency or "strip" as it is hereinafter sometimes called, therein in position for the images of the respective stereoscopic pairs of frames to be viewed through lenses by the observer when the viewer is held in viewing position. The "strip" herein referred to may also be designated a film, in accordance with popular custom. The term film is intended to include in its meaning a strip or element bearing images produced as a result of photographic and developing processes.

The viewer is self-contained, having a light source including a bulb for illuminating the film, and a dry battery for energizing the bulb.

The viewer includes a casing 12 for mounting and at least partially enclosing substantially all the elements. The casing may be of any suitable material, such as plastic or wood and preferably of such material as to lend itself to convenient shaping methods. The casing 12 is provided with a forward cavity 18 and a rear cavity 20, the latter being utilized for a battery 22 which may be made up of one or more individual cells. The cell or cells may be releasably retained in the cavity by convenient means, such as spring clips 24 of suitable and well-known type secured to the floor or inner wall of the cavity and having spring biased legs between which the cells are inserted. The cavity 20 is provided with suitable contact elements 26 of well-known type for engaging the respective terminals of the battery, being connected with leads 28 connected to a socket 30, the socket supporting a suitable light bulb 32 disposed in the forward cavity 18 and within a strip support or film support 34, which will be described later. Suitable switch means (not shown) may be provided in one of the leads 28, with a manually actuatable element exposed to the exterior of the casing.

The light bulb is for the purpose of illuminating a strip or film 36, also referred to as a transparency, disposed in the forward cavity 18 in position for presenting the images on the film to the viewer.

Preferably the casing 12 is open at the top, as shown in order to permit rapid and convenient insertion and removal of strips. However, if desired a cover 16 may be provided, which may be attached by spring clips 17 to the casing 12. The cover serves to prevent the entry of dust and other foreign matter into the casing when the viewer is not in use.

The strip support 34 is arranged for supporting and guiding the strip or film in its movements in the viewer for successively presenting pairs of stereoscopic images for viewing. The strip or film is guided into engagement with the outer surface of the film support, the latter being of translucent nature for transmitting the light rays from the bulb therethrough. Preferably, the film support 34 is in the form of a tubular or hollow cylindrical member which may conveniently be open at both ends. It is removably positioned in the cavity 18 substantially centrally thereof in transverse directions and between the axes of the lenses, as will be brought out later in detail. The strip support 34 surrounds the light bulb 32 in its socket and preferably snugly engages the base 38 of the socket which aids in maintaining the support in properly centered position. The center wall 42 dividing the cavities 18 and 20 may be provided with an arcuate supporting surface 44 for engagement by the film support so as to aid in stabilizing it, the surface 44 and the socket base retaining the support in accurate predetermined relationship with respect to the optical system which will be described later. The film support 34 preferably has a groove 46 in its periphery having a substantial axial dimension, forming shoulders at the upper and lower ends, the groove providing a guide for the strip or film in its movement over the surface of the support and having a smooth surface for permitting the film to be drawn thereover without scratching or marring the film. The support 34 may be formed of any suitable translucent material. "Lucite," for example, has been found to have the desired characteristics. The strip 36 preferably is first wound on one or the other of a pair of spools 48, threaded through the viewer, and then wound on the second spool from the first. The spools are removably supported on shafts or spindles 50 journaled in the casing in any suitable manner, such as by journalling them in bearing openings in the bottom wall of the casing with their ends projecting therethrough. The lower ends of the shafts or spindles may be polygonal in cross-section for fitting suitable means for manually rotating the shafts and spools, such for example as a crank 54. The spools and shafts may have suitable co-operating conformations for producing rotation of the spools in response to rotation of the shafts, but enabling the spools to be removed from the shafts in axial direction. A crank may be provided for each of the shafts or, if desired, a single crank may be provided for removably fitting on either of them and placed on one or the other according to the desired direction of feed of the strip or film. The spools may also have suitable elements for locking the end of the film thereon for positively feeding the film upon rotation of the spool.

The spools 48 are conveniently located generally on opposite sides of the film support, in transverse directions, and adjacent the rear of the forward cavity 18. The film is trained around idler rolls 55, journaled in the casing in any suitable manner and positioned for guiding the film onto the film support in such a way that the film engages the film support throughout a substantial portion of the circumference of the latter and particularly along opposite sides thereof, as will be brought out later in the description of the optical system. The cavity 18 may be provided with suitable indentations for accommodating the spools and idler rolls. If preferred, an alternative arrangement may be provided for feeding the film, including sprockets replacing the idler rolls and engaging perforations in the film, and means for rotating the sprockets.

Lens assemblies 56R and 56L, which may for convenience be referred to simply as lenses, are right and left lenses, respectively, of suitable well-known converging type. The lens assemblies include lens elements 62 mounted in suitable housings or mounts 64 with constricted or masked apertures 64a of suitable size according to the size of the images and the distance between the images and the masks to restrict the view to the boundaries respectively of the frames being viewed. The lens elements are selected so as to properly present the images to the eyes considering the proximity of the eyes to the lenses in the use of the device. Further details of the lenses need not be entered into since lens elements and mounts of a character suitable for the viewer are well-known. The lenses are mounted in a side wall 66 of the casing which may be designated the front side wall, in a suitable manner such as by mounting them in apertures in the wall and securing them in place therein. The lens assemblies may have enlarged outer head portions engaging the casing wall for limiting their movement inwardly.

The lenses 56R and 56L are disposed with their axes extending parallel in fore and aft directions and spaced apart transversely a standard interocular distance. The axes of the lenses lie in a plane disposed substantially horizontal (with respect to the position of the viewer when in use). The film support 34 is disposed with its axis extending substantially perpendicular to the plane of the lens axes so that the surface portions of the film support have elements disposed perpendicular or transverse to the plane of the lens axes.

Positioned in the cavity 18 are right and left mirrors 68R and 68L, respectively, mounted on suitable supports 72 which may include upright elements having turned over flanges secured to the bottom wall of the cavity. The upright elements of the mirror supports are preferably of suitable dimensions for engagement by the mirrors throughout the dimensions of the latter to the end of accurately positioning the lens relative to the film support and lens axes. The mirrors 68R and 68L lie on the axes of the right and left lenses respectively and are angularly inclined both to the axes of the lenses and to the film support 34, being also positioned adjacent to and opposite the side surface portions 73 of the film support.

The film is disposed in the viewer in a position which is inverted relatively to its position in the camera and the mirrors are arranged for reversing the images individually from side to side, whereby the images when presented for viewing are oriented according to the object as photographed. The preferred manner of arranging the film and mirrors for presenting the images to the lenses is to locate the film support between the axes of the lenses. This arrangement enables the mirrors to be disposed opposite the side surface portions of the film support adjacent complementary stereoscopic image frames which are disposed on generally opposite sides of the film support, the film support being appropriately dimensioned relative to the film for that purpose. The mirrors are disposed vertically and thus parallel with the axis of the film support and parallel with the vertical elements of the surface of the film support and hence, the overlying portions of the film. The images on the film opposite the mirrors are thus reversed individually from side to side by the mirrors and presented in such reversed form for viewing through the lenses.

In Figs. 4, 5 and 6 are shown diagrammatically certain steps in the production of stereoscopic films and viewing them in the viewer of the invention. In Fig. 4 the object is represented diagrammatically by a panel 74 having a figure representation 76 thereon. The film or transparency 36 is disposed opposite the object. The diagrammatic showing of the panel 74 and film 36 in Fig. 4 indicates parallel arrangement therebetween, the apparent displacement from parallelism being resorted to for the purpose of facilitating representation of the photographic steps. The film 36 is arranged in the stereoscopic camera oriented according to the direction indicated by the arrow 78, i. e., the emulsion side 80 of the film is presented to the object. The film is transported or fed through the stereoscopic camera having lenses 82R and 82L respectively. The right and left images 86R and 86L on the film are individually oriented in accordance with the inversion, and reversion from side to side, established by a camera, such inversion and reversion being a well known phenomenon. These images are spaced at standard interocular distance, complementally to the interocular spacing of the lenses of the viewer.

Considering either image 86R and 86L alone, it may be oriented according to the object for viewing merely by inverting it and viewing it through the glossy side, i. e., the side opposite that presented to the observer in Fig. 4. However, in the case of stereoscopic images, if the images were to be oriented in the manner mentioned above, namely, inverting the film and viewing the images from the appropriate side, the images would be interchanged in position, i. e., the right image would be positioned for viewing by the left eye and the lift image for viewing by the right eye. It is because of this fact that in the use of previously known stereoscopic viewers in which the images were viewed directly, it was necessary to sever the film and remount the frames according to the right and left relative positions thereof. The viewer of the present invention overcomes such disadvantage and enables the film to be correctly viewed without severing the film and remounting the frames.

For the purpose of facilitating tracing the movement of the film through the viewer (for instance as in Fig. 5), the film 36 is designated as having ends 90 and 92, an upper edge 94 and a lower edge 96. The film is wound on either of the spools 48, as desired, according to the preference of the direction it is to be fed through the viewer. Assume it is to be wound first on the spool 48 to the right in Fig. 5; the film is inverted so that the previous upper edge 94 is lowermost and the previous lower edge 96 is uppermost, and wound so that the emulsion side 80 of the film is outermost. The end 92 is secured to the spool so that after it is wound thereon, the end 90 is free. The film is then threaded around the adjacent idler roll 55, over the film support, then over the other idler roll 55 and then to the opposite spool 48. Since in winding the film on the spool the emulsion side 80 is outermost, that surface is outermost on the film support.

When the film is so threaded through the viewer, the images 86R and 86L are inverted but not, of course, individually reversed. As indicated in Fig. 5, the right image 86R is positioned adjacent the right mirror 68R and the left image 86L is positioned adjacent the left mirror, and hence the images are arranged in right and left positions according to the right and left positions respectively of the mirrors and lenses. The images 86R and 86L are then individually reversed from side to side by the respective mirrors, as indicated by the images 98R and 98L in the mirror which, by comparison, may be seen to be oriented according to the object in Fig. 4. The images in the mirrors are then transmitted through the lenses oriented in the positions indicated in the mirrors in Fig. 5. When the film is fed over the film support as just described, the frames thereof bearing the complementary images overlie the opposite side surface portions 73 of the support. In Fig. 5 this relationship is slightly disturbed by bringing the images toward the front. This slight distortion is provided solely for the purpose of clearly exposing the images to view in the drawing.

It therefore will be seen that it is not necessary to sever the stereoscopic film strip and remount the individual frames. The film is merely placed in the viewer in such a way that as it is fed through the viewer, the right and left images on the film strip are presented respectively to the right and left mirrors and lenses. The inversion of the film strip in the viewer provides the desired inversion of the images and mirrors provide the reversion.

The film 36 as indicated in Fig. 6 bears a plurality of pairs of complementary stereoscopic images in frames 102 indicated diagrammatically on the film, the numerals 104 designating stereoscopic pairs according to the coincidence of like numerals. The film may be fed in either direction through the camera in taking the photographs, and similarly in either direction through the viewer. However for convenience herein, reference will be had to feeding through the camera and viewer in the same direction. Consider the film as being fed through the camera (Fig. 4) as indicated by the arrow 107, and through the viewer as indicated by the arrow 108 (Fig. 6), in both cases, the end 99 of the film constituting the leading end. The following reference to the film as illustrated in Fig. 6 has to do with the production of the images in the camera and viewing them in the viewer.

The numerals 106 designate positions of the lenses of the viewer when positioned for viewing respective pairs of complementary images, the positions being offset successively from left to right to indicate the relative positions of the film to the lenses. Preferably the film frames 102 are formed in such dimensions relative to the spacing of the camera lenses that the complementary stereoscopic images of a pair are spaced apart three frame-lengths. Preferably also each pair is spaced along the film two frame-lengths from an adjacent pair, the film being fed through the camera in successive increments of two frame-lengths. It will be seen that the two frames #1 are spaced apart three frame-lengths. The two frames #2 are similarly spaced apart three frame-lengths and are spaced along the film two frame-lengths from the respective frames #1. As in the camera, the film is also fed through the viewer in successive increments of two frame-lengths. The viewer lenses in the #1 position are in position for viewing the complementary images on the #1 frames. The lenses in their #2 position are offset respectively from the #1 positions a distance of two frame-lengths and hence in position for viewing the images on the #2 frames. The succession is carried out throughout the length of the film. The second frame 102 immediately to the right of the end frame #1 is blank but all positioned after the one just mentioned bear images. The film may have blank lead portions at its ends of sufficient length for securement to the respective spools while enabling positioning of the end images in proper position on the film support and adjacent the mirrors.

I claim:

1. A viewer for stereoscopic transparencies in strip form comprising a casing having a cavity with a front side wall defining one side of the cavity and a rear wall element defining an opposite side wall of the cavity, a pair of converging lenses mounted in said side wall in spaced, axially parallel arrangement, an inetgral tubular film support of translucent material mounted in said cavity between the axes of the lenses, said film support having its axis disposed vertically, the floor of the casing having means for supporting the film support at its lower end and said opposite wall element providing support for the upper end of the film support against displacement in that direction, the film support also having viewing areas on opposite sides with each adjacent the respective lens axis, means for mounting a transparency strip in the casing including rolls and guides respectively on opposite sides of the film support and generally rearwardly thereof and thereby positioned for maintaining a strip taut on the front and viewing areas of the film support, manually operable means for operating the strip mounting means for moving the strip over the film support in direction from one viewing area to the other, means within the film support for illuminating transparencies on said viewing areas, and a pair of mirrors disposed on the lens axes respectively and inclined thereto at an angle to present for viewing through the corresponding lenses images of transparencies positioned on said viewing areas on the film support.

2. A viewer for steroscopic transparencies in strip form comprising a casing having a cavity with a front side wall defining one side of the cavity and a rear wall element defining an opposite side wall of the cavity, a pair of converging lenses mounted in said side wall in spaced, axially parallel arrangement, an integral tubular film support of translucent material mounted in said cavity between the axes of the lenses, said film support having its axis disposed vertically, the floor of the casing having means for supporting the film support at its lower end and said opposite wall element providing support for the upper end of the film support against displacement in that direction, the film support also having viewing areas on opposite sides with each adjacent the respective lens axis, means for mounting a transparency strip in the casing including rolls and guides respectively on opposite sides of the film support and generally rearwardly thereof and thereby positioned for maintaining a strip taut on the front and viewing areas of the film support, manually operable means for operating the strip mounting means for moving the strip over the film support in direction from one viewing area to the other, means within the film support for illuminating transparencies on said viewing areas, a pair of mirrors disposed on the lens axes respectively and inclined thereto at an angle to present for viewing through the corresponding lenses images of transparencies positioned on said viewing areas on the film support, said casing also having a second cavity on the side of said rear wall element opposite the first-mentioned cavity, and a battery in the second cavity having conductors connected with said illuminating means.

References Cited in the file of this patent

UNITED STATES PATENTS

| | | |
|---|---|---|
| 1,579,025 | Owens | Mar. 20, 1926 |
| 1,957,043 | Harlow | May 1, 1934 |
| 2,207,483 | Hennicke et al. | July 9, 1940 |
| 2,296,765 | Brost | Sept. 22, 1942 |
| 2,339,822 | Blaricon et al. | Jan. 25, 1944 |
| 2,674,152 | Wilkinson | Apr. 6, 1954 |
| 2,694,339 | Baireuther et al. | Nov. 16, 1954 |

FOREIGN PATENTS

| | | |
|---|---|---|
| 854,581 | France | Jan. 24, 1940 |